United States Patent
Hou et al.

(10) Patent No.: US 10,324,217 B2
(45) Date of Patent: Jun. 18, 2019

(54) METHOD AND SYSTEM FOR REAL TIME DETERMINATION OF FORMATION ANISOTROPY, DIP, AND STRIKE WITH MCI DATA

(75) Inventors: Junsheng Hou, Kingwood, TX (US); Luis San Martin, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 477 days.

(21) Appl. No.: 14/425,683

(22) PCT Filed: Sep. 12, 2012

(86) PCT No.: PCT/US2012/054750
§ 371 (c)(1),
(2), (4) Date: Mar. 4, 2015

(87) PCT Pub. No.: WO2014/042621
PCT Pub. Date: Mar. 20, 2014

(65) Prior Publication Data
US 2015/0260872 A1 Sep. 17, 2015

(51) Int. Cl.
*G01V 3/20* (2006.01)
*E21B 47/026* (2006.01)
*G01V 3/38* (2006.01)
*G01V 11/00* (2006.01)
*G01V 3/28* (2006.01)

(52) U.S. Cl.
CPC ............. *G01V 3/20* (2013.01); *E21B 47/026* (2013.01); *G01V 3/38* (2013.01); *G01V 11/00* (2013.01); *G01V 3/28* (2013.01)

(58) Field of Classification Search
CPC ....................................................... G01V 3/20
See application file for complete search history.

(56) References Cited

U.S. PATENT DOCUMENTS

| | | |
|---|---|---|
| 4,360,777 A | 11/1982 | Segesman |
| 4,471,436 A | 9/1984 | Schaefer et al. |
| 4,857,852 A | 8/1989 | Kleinberg et al. |
| 5,115,198 A | 5/1992 | Gianzero et al. |
| 5,757,191 A | 5/1998 | Gianzero |
| 5,999,883 A | 12/1999 | Gupta et al. |
| 6,044,325 A | 3/2000 | Chakravarthy et al. |
| 6,466,872 B1 | 10/2002 | Kriegshauser et al. |

(Continued)

FOREIGN PATENT DOCUMENTS

WO 2011/123379 A1 10/2011

OTHER PUBLICATIONS

International Search Report and Written Opinion issued in related PCT Application No. PCT/US2012/054750 dated Aug. 20, 2013, 13 pages.

*Primary Examiner* — Yu-Hsi D Sun
(74) *Attorney, Agent, or Firm* — Benjamin Fite; Baker Botts L.L.P.

(57) ABSTRACT

Method and system for improving the speed and accuracy of determining formation properties using multiple logging data are disclosed. Logging data relating to the formation of interest is obtained and used as an input. High frequency noise is then removed from the logging data and bed-boundary determination is performed using the logging data. An adaptive low pass filter is applied to the logging data and the logging data is inverted. The inverted logging data is then visually interpreted.

20 Claims, 8 Drawing Sheets

(56) References Cited

U.S. PATENT DOCUMENTS

| | | |
|---|---|---|
| 6,502,036 B2 | 12/2002 | Zhang et al. |
| 6,819,112 B2 | 11/2004 | Gianzero et al. |
| 6,900,640 B2 | 5/2005 | Fanini et al. |
| 7,268,556 B2 | 9/2007 | Fanini et al. |
| 7,737,697 B2 | 6/2010 | Yu et al. |
| 7,952,358 B2 | 5/2011 | Wang et al. |
| 2003/0018434 A1 | 1/2003 | Kriegshauser et al. |
| 2003/0105591 A1* | 6/2003 | Hagiwara ................ G01V 3/28 702/7 |
| 2006/0173624 A1 | 8/2006 | Frenkel |
| 2010/0082255 A1 | 4/2010 | Davydycheva et al. |
| 2011/0231098 A1 | 9/2011 | Omeragic et al. |

* cited by examiner

METHOD AND SYSTEM FOR REAL TIME DETERMINATION OF FORMATION ANISOTROPY, DIP, AND STRIKE WITH MCI DATA

CROSS-REFERENCE TO RELATED APPLICATION

This application is a U.S. National Stage Application of International Application No. PCT/US2012/054750 filed Sep. 12, 2012, which is hereby incorporated by reference in its entirety.

BACKGROUND

Hydrocarbons, such as oil and gas, are commonly obtained from subterranean formations. The development of subterranean operations and the processes involved in removing hydrocarbons from a subterranean formation are complex. Typically, subterranean operations involve a number of different steps such as, for example, drilling a wellbore at a desired well site, treating the wellbore to optimize production of hydrocarbons, and performing the necessary steps to produce and process the hydrocarbons from the subterranean formation.

Modern oil field operations demand a great quantity of information relating to the parameters and conditions encountered downhole. Such information may include characteristics of the earth formation traversed by the wellbore and data relating to the size and configuration of the wellbore itself. The collection of information relating to conditions downhole, which is commonly referred to as "logging," can be performed by several methods, including wireline logging, logging-while-drilling ("LWD"), drillpipe conveyed logging, and coil tubing conveyed logging. A variety of logging tools are available for use with each of these methods. These logging tools may be used to perform wellbore imaging. Wellbore imaging is an important aspect of drilling and geosteering when performing subterranean operations.

Multi-component induction ("MCI") logging is one of the logging methods used to analyze subterranean formations. An objective of MCI logging is fast and accurate delivery of resistivity anisotropy (horizontal and vertical resistivities), dip, strike of formation, and conventional ("ZZ") induction logs. Current MCI logging methods may be susceptible to errors because the inversion algorithm used is based on a radial one-dimensional ("R1D") forward model and only on MCI data. Therefore, in instances where there are strong shoulder-bed and horn effects included in the MCI measurements or in instances when the MCI data is obtained in complex borehole environments (e.g., an oval hole), the accuracy of the inverted results can be significantly degraded.

BRIEF DESCRIPTION OF THE DRAWING(S)

The present disclosure will be more fully understood by reference to the following detailed description of the preferred embodiments of the present disclosure when read in conjunction with the accompanying drawings, in which like reference numbers refer to like parts throughout the views, wherein.

Figure 6:
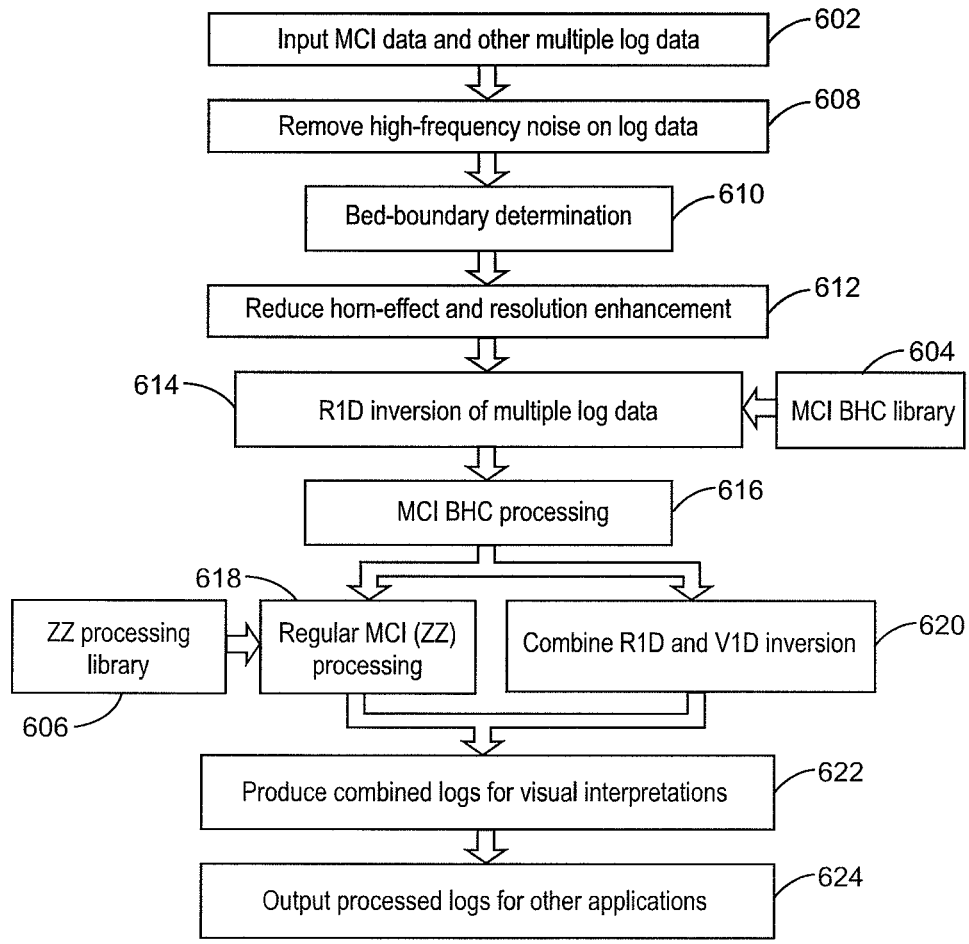

FIG. 6 generally depicts different aspects of a data processing method in accordance with an embodiment of the present disclosure.

Figure 7:
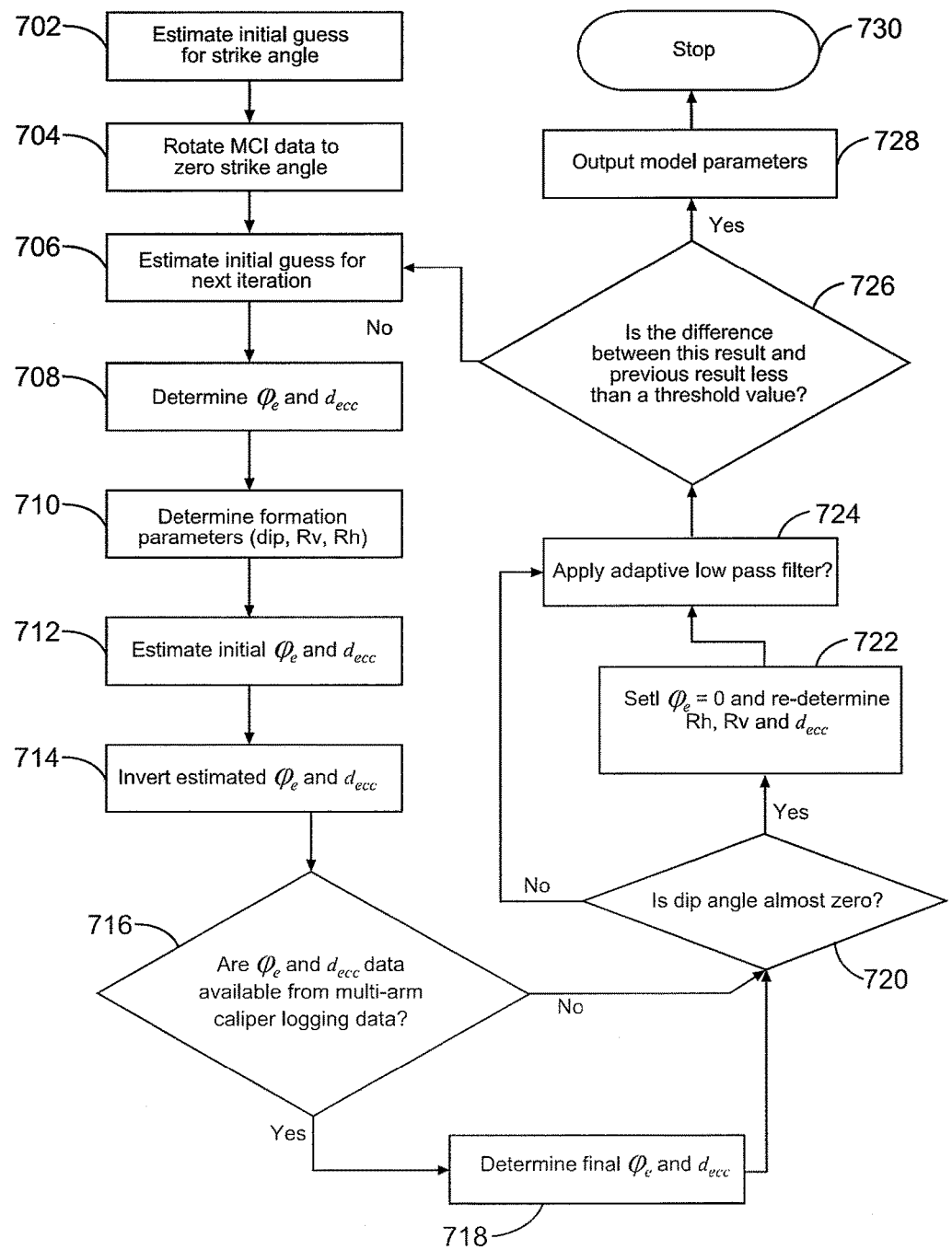

FIG. 7 depicts general steps associated with R1D inversion algorithm of multiple log data in accordance with an exemplary embodiment of the present disclosure.

The disclosure may be embodied in other specific forms without departing from the spirit or essential characteristics thereof. The present embodiments are therefore to be considered in all respects as illustrative and not restrictive, the scope of the disclosure being indicated by the appended claims rather than by the foregoing description, and all changes which come within the meaning and range of equivalency of the claims are therefore intended to be embraced therein.

DETAILED DESCRIPTION OF THE DISCLOSURE

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

For the purposes of this disclosure, computer-readable media may include any instrumentality or aggregation of instrumentalities that may retain data and/or instructions for a period of time. Computer-readable media may include, for example, without limitation, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such as wires, optical fibers, microwaves, radio waves, and other electromagnetic and/or optical carriers; and/or any combination of the foregoing.

The term "uphole" as used herein means along the drillstring or the wellbore hole from the distal end towards the surface, and "downhole" as used herein means along the drillstring or the wellbore hole from the surface towards the distal end. The term "strike" as used herein refers to the direction of a line formed by the intersection of the surface of an inclined bed with a horizontal plane. The term "dip" as used herein refers to the angle of slope of an inclined bed measured perpendicular to the strike and in the vertical plane, referenced to the horizontal plane.

Illustrative embodiments of the present invention are described in detail herein. In the interest of clarity, not all features of an actual implementation may be described in this specification. It will of course be appreciated that in the development of any such actual embodiment, numerous implementation-specific decisions may be made to achieve the specific implementation goals, which may vary from one implementation to another. Moreover, it will be appreciated that such a development effort might be complex and time-consuming, but would nevertheless be a routine undertaking for those of ordinary skill in the art having the benefit of the present disclosure.

To facilitate a better understanding of the present invention, the following examples of certain embodiments are given. In no way should the following examples be read to limit, or define, the scope of the invention. Embodiments of the present disclosure may be applicable to horizontal, vertical, deviated, or otherwise nonlinear wellbores in any type of subterranean formation. Embodiments may be applicable to injection wells as well as production wells, including hydrocarbon wells. Embodiments may be implemented using a tool that is suitable for testing, retrieval and sampling along sections of the formation. Embodiments may be implemented with tools that, for example, may be conveyed through a flow passage in tubular string or using a wireline, slickline, coiled tubing, downhole robot or the like. "Measurement-while-drilling" ("MWD") is the term generally used for measuring conditions downhole concerning the movement and location of the drilling assembly while the drilling continues. "Logging-while-drilling" ("LWD") is the term generally used for similar techniques that concentrate more on formation parameter measurement. Devices and methods in accordance with certain embodiments may be used in one or more of wireline, MWD or LWD operations.

The present application is directed to improving performance of subterranean operations and more specifically, to a method and system for improving the speed and accuracy of determining formation properties using logging data.

The methods and systems disclosed herein combine MCI measurements with other multiple logging data (e.g., multi-arm caliper, directional logging, and imager/dipmeter) acquired in a well filled with oil-based mud ("OBM"). Additionally, the methods and systems disclosed herein improve conventional (ZZ) induction logs. Specifically, a multi-step inversion algorithm is developed which improves analysis of the formation using MCI data.

An adaptive low-pass filtering technique is utilized to remove horn effects in some components based on log-data uncertainty and bed-boundary information, thereby reducing the overall impact of horn effects. The term "horn effects" as used herein refers to the effect on an MCI log of charge buildup at the boundary between two formation beds with different conductive properties. Specifically, the current loops generated by the tool in the formation cross the bed boundaries and generate a charge buildup at the boundaries between the formation beds. The result is a spike to high resistivity compared to true tool readings around the formation bed boundaries. This effect depends on the resistivity contrast between the formation beds and relative dip between the hole and the formation bed. The magnitude of the spikes varies with different MCI components (e.g., ZZ, XX, YY, and ZX) and their spacing.

The term "log-data uncertainty" as used herein refers to the measurement error/precision. The term "bed-boundary information" as used herein refers to the boundary position along the borehole axis. Due to higher vertical resolution and lower horn effects of some combined MCI logs, different combined MCI logs are used for the R1D inversion. Further, Software Focusing ("SWF") processing may be used for further enhancing the vertical resolution of the MCI data. In certain embodiments, the accuracy of the inverted results may be improved by using multiple log information (e.g., multi-arm caliper, directional measurements, and image/dipmeter) to form finalized results of horizontal and vertical resistivities and dip angle by combining R1D and vertical one-dimensional ("V1D") inversion results. It is well known that the conventional ZZ induction processing is usually based on a borehole-correction (BHC) model of a vertical borehole surrounded by a full-space isotropic formation. However, as discussed in more detail below, in the methods and systems disclosed herein the ZZ processing uses a more realistic BHC model, including dip and formation anisotropic parameters, thereby improving the ZZ resistivity logs.

Figure 1A:
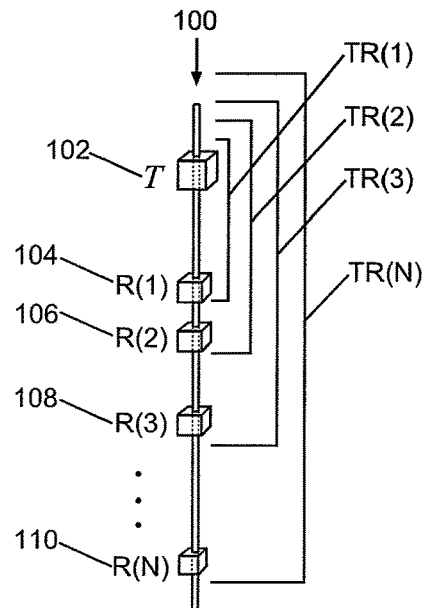
FIG. 1A is an exemplary multi-component induction logging tool in accordance with an embodiment of the present disclosure.

FIG. 1A depicts an exemplary MCI logging tool ("MCI tool") that may be used in accordance with an embodiment of the present disclosure denoted generally with reference numeral 100. In certain embodiments, the MCI tool (100) may include a transmitter T (102) and a number of receivers (104, 106, 108, 110) positioned at different axial positions along the MCI tool (100). As shown in more detail in FIG. 1B and discussed below, each receiver (104, 106, 108, 110) may include separate main (112) and bucking (114) triads. The transmitter (102) and receivers (104, 106, 108, 110) of the MCI tool (100) form N triaxial subarrays (denoted as TR(1)-TR(N)).

Figure 1B:
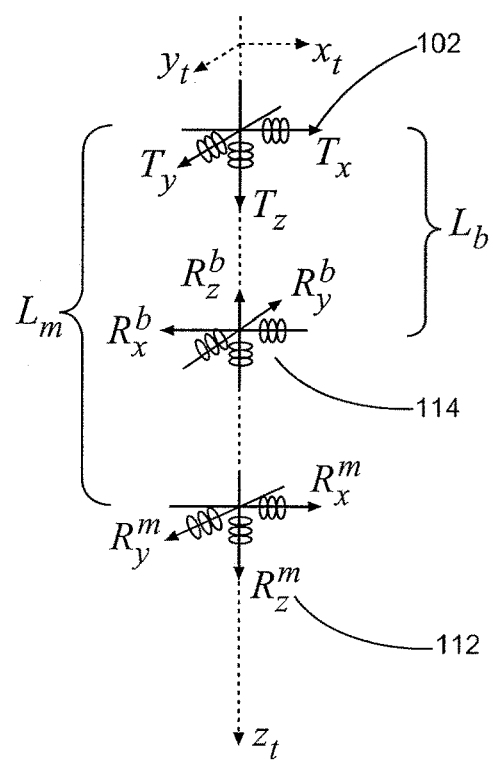
FIG. 1B is a triaxial subarray of the MCI logging tool of FIG. 1A.

FIG. 1B depicts a triaxial subarray TR(1) of the MCI tool (100) formed by the transmitter (102) and the receiver R1 (104). Specifically, the Transmitter (102) may include three mutually orthogonal co-located transmitters (Tx, Ty, Tz). The receiver R1 (104) of the triaxial subarray TR1 may further include a main triaxial receiver (112) and a bucking triaxial receiver (114). The main triaxial receiver (112) and the bucking triaxial receiver (114) may each include a set of three mutually orthogonal co-located receivers ($R^m x$, $R^m y$, $R^m z$) and ($R^b x$, $R^b y$, $R^b z$), respectively. As shown in FIG. 1B, $L_m$ and $L_b$ denote the transmitter-receiver spacing of the main triaxial receiver (112) and the bucking triaxial receiver (114), respectively. Further, the tool/measurement coordinates are denoted as ($x_t$, $y_t$, $z_t$) in FIG. 1B. Accordingly, each triaxial subarray (TR(1)-TR(N)) may measure and generate a nine-coupling voltage measurement in the tool/measurement coordinate system ($x_t$, $y_t$, $z_t$) at every log depth. The voltages measured on the receivers (104, 106, 108, 110) may be converted into apparent conductivities and expressed as a 3-by-3 tensor or matrix for a triaxial multi-array tool operated at a given frequency:

$$\overline{\sigma_a^{(i)}} = \begin{bmatrix} \sigma_{xx}^{(i)} & \sigma_{xy}^{(i)} & \sigma_{xz}^{(i)} \\ \sigma_{yx}^{(i)} & \sigma_{yy}^{(i)} & \sigma_{yz}^{(i)} \\ \sigma_{zx}^{(i)} & \sigma_{zy}^{(i)} & \sigma_{zz}^{(i)} \end{bmatrix} = (\sigma_{IJ}^{(i)}) \text{ where } I,$$  [Eq. 1]

$$J = x, y, z \text{ and } i = 1, 2, \ldots, N$$

where $\overline{\sigma_a^{(i)}}$ is referred to as the MCI apparent conductivity tensor (R-signal or X-signal) in the tool coordinate system, $\sigma_{IJ}^{(i)}$ is the measured conductivity coupling with the first subscript (I) indicating the transmitter direction and the second subscript (J) indicating the receiver direction. Accordingly, when I, J=x, $\sigma_{IJ}^{(i)}$ is $\sigma_{xx}^{(i)}$ or (XX); when I, J=y, $\sigma_{IJ}^{(i)}$ is $\sigma_{yy}^{(i)}$ or (YY); and when I, J=z, $\sigma_{IJ}^{(i)}$ is $\sigma_{zz}^{(i)}$ (or ZZ). These are the traditional (ZZ) multiarray induction measurements. Further, N is the total number of triaxial subarrays of the MCI tool (100).

In certain embodiments, combined log signals may be produced from the nine couplings of the triaxial subarrays of the MCI tool (100) using transformations. Specifically, three direct couplings $\sigma_{xx}^{(i)}$, $\sigma_{yy}^{(i)}$, and $\sigma_{zz}^{(i)}$ may be used to obtain combined-log signals using the following linear transformation:

$$\sigma_{dc}^{(i)} = a^{(i)} \cdot \sigma_{zz}^{(i)} + b^{(i)} \cdot \sigma_{xx}^{(i)} + c^{(i)} \cdot \sigma_{yy}^{(i)}, i=1,2,\ldots,N$$  [Eq. 2]

where $\sigma_{dc}^{(i)}$ is referred to as the direct-coupling combined log signal for a multiarray MCI tool; three coefficients $a^{(i)}$, $b^{(i)}$ and $c^{(i)}$ are the constants for fixed array and frequency and generally, $a^{(i)}+b^{(i)}+c^{(i)}=1$. Accordingly, as examples, if $a^{(i)}=1.5$, $b^{(i)}=c^{(i)}=-0.5$, then the combined log signal ($\sigma_{dc}^{(i)}$) would be [3ZZ−(XX+YY)]/2; if $a^{(i)}=2.0$, $b^{(i)}=-1$ and $c^{(i)}=0$, then the combined log signal would be [2ZZ−XX]; and if $a^{(i)}=2.0$, $b^{(i)}=0$ and $c^{(i)}=-1$, then the combined log signal would be [2ZZ−YY].

The combined log signals may be obtained from the cross couplings $\sigma_{IJ}^{(i)}$ and $\sigma_{JI}^{(i)}$ (I≠J) of $\overline{\sigma_a^{(i)}}$, using the following linear transformation:

$$\sigma_{cc}^{(i)} = d^{(i)} \cdot \sigma_{IJ}^{(i)} + e^{(i)} \cdot \sigma_{JI}^{(i)}, i=1,2,\ldots,N$$  [Eq. 3]

where $\sigma_{cc}^{(i)}$ is the cross-coupling combined log signal and the two coefficients $d^{(i)}$ and $e^{(i)}$ are constants for fixed array and frequency where generally, $0 \le d^{(i)}+e^{(i)} \le 1.0$. For instance, if I=x, J=z and d(i)=e(i)=0.5, then the cross-coupling combined log signal $\sigma_{cc}^{(i)}$ would be (XZ+ZX)/2 from the cross-couplings XZ and ZX.

Figure 2A:
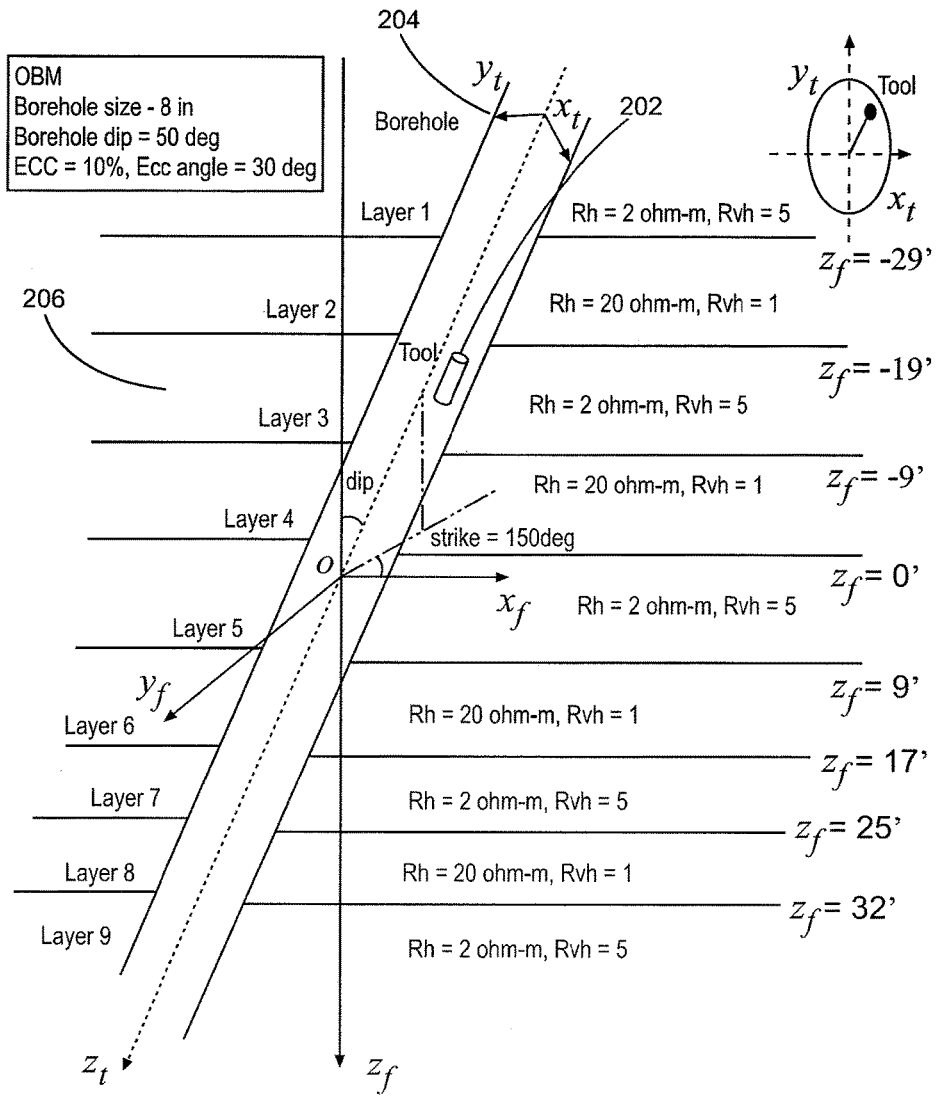
FIG. 2A depicts a model with an MCI logging tool going through a borehole in a 9-layer formation.
Figure 2B:
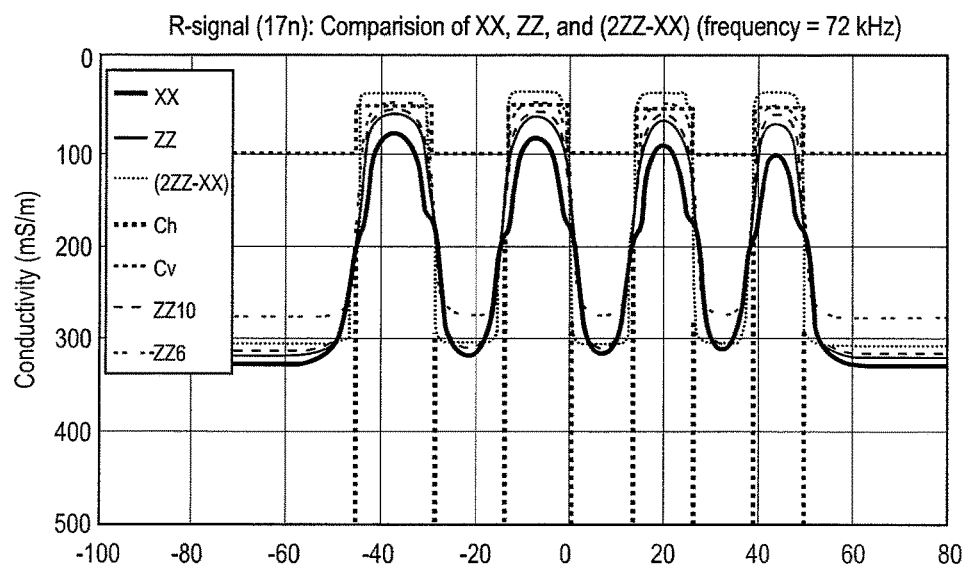
FIGS. 2B and 2C depict the simulated results of the combined log signals 2ZZ–XX and (XZ+ZX)/2, respectively, and raw MCI components (all solid lines: XX, ZZ, XZ, ZX) at 72 kHz.
Figure 2C:
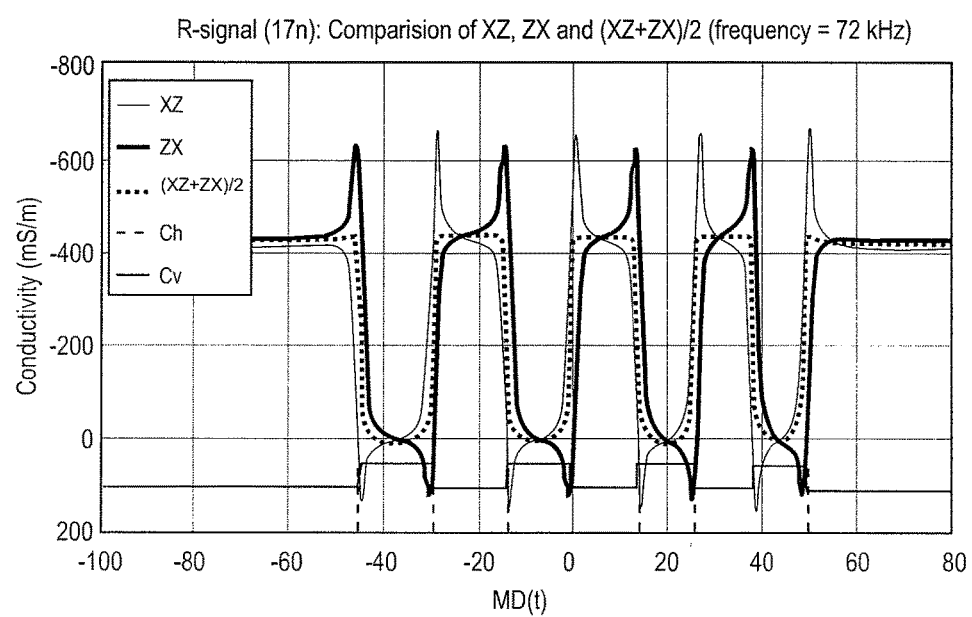

FIG. 2A depicts a model with an MCI tool (202) going through a borehole (204) in a formation (206). The formation (206) is shown as having a plurality of layers (layer 1-layer 9) which the borehole (204) traverses. The formation coordinates are denoted as $(x_f, y_f, z_f)$ and the tool/measurement coordinates are denoted as $(x_t, y_t, z_t)$. FIGS. 2B and 2C depict the simulated results of the combined log signals (all dashed lines 2ZZ−XX, (XZ+ZX)/2) and raw MCI components (all solid lines: XX, ZZ, XZ, ZX) at 72 kHz. In FIG. 2B, ZZ10 and ZZ6 are the ZZ measurements for 10 inch and 6 inch arrays, respectively. All other measurements depicted in FIGS. 2B and 2C are for 17 inch arrays. The dashed-dot lines of FIGS. 2B and 2C depict the true formation horizontal conductivity (Ch) and vertical conductivity (Cv) where Ch=1/Rh and Cv=Ch/Rvh; here Rh and Rvh denote the horizontal resistivity and anisotropic ratio, respectively. As shown in FIG. 2A, two three-dimensional Cartesian/rectangular coordinate systems are defined as $(x_t, y_t, z_t)$ (tool coordinates) and $(x_f, y_f, z_f)$ (formation coordinates). The parameter $z_f$ stands for the z-axis of $(x_f, y_f, z_f)$ system.

As shown in FIGS. 2B and 2C, the vertical resolution of the combined log (2ZZ−XX) is higher than those of the components ZZ and XX for the same array and even higher than those of ZZ10 and ZZ6 signals for shorter-spacing 10 inch and 6 inch arrays. Moreover, as shown in FIGS. 2B and 2C, the horn effects are reduced by comparing (XZ+ZX)/2 and raw signals XZ and ZX.

Figures 3A, 3B:
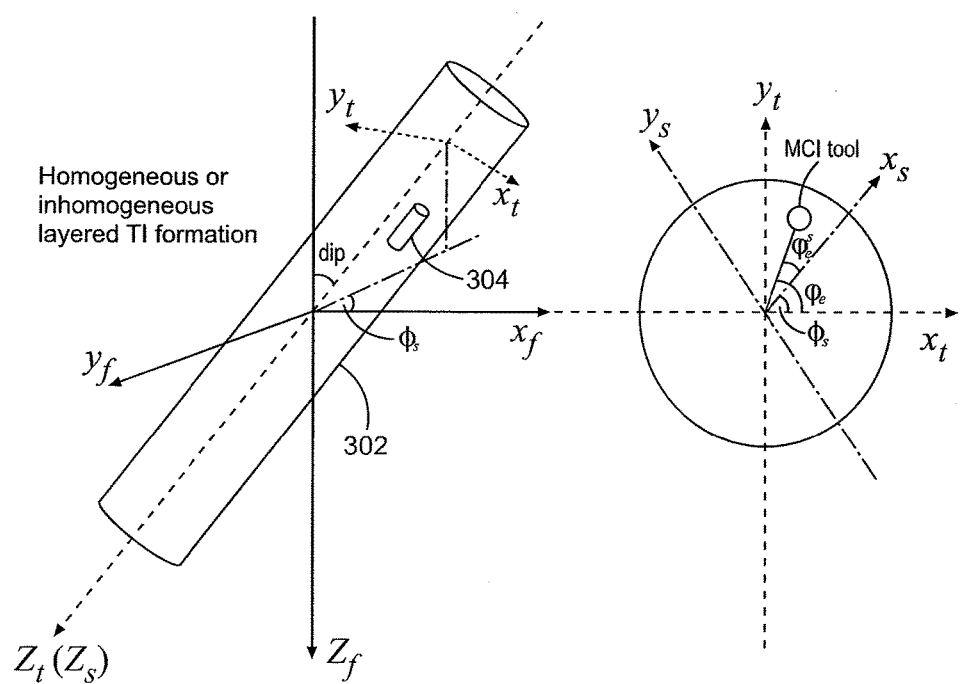
FIGS. 3A and 3B depict a 3D view and a 2D view, respectively, of a forward model for both R1D and V1D inversions.

FIGS. 3A and 3B depict 3D and 2D views of forward model for both R1D and V1D inversions, respectively. Specifically, FIG. 3A shows a 3D view and FIG. 3B shows a 2D view in the $x_t$-$y_t$ plane. A forward model consisting of a borehole (302) with a circular cross-section surrounded by an infinitely thick homogenous formation may be used for the radial 1D (R1D) inversion. The borehole (302) may be vertical or deviated and the MCI tool (304) may be centralized or decentralized in the borehole (302). The formation resistivity may be isotropic or transversely isotropic (TI). The tool coordinate system is denoted as $(x_t, y_t, z_t)$ and the formation coordinate system is denoted as $(x_f, y_f, z_f)$. Additionally, $(x_s, y_s, z_s)$ is provided as an intermediate coordinate system which is referred to as the strike coordinate system. For a vertical 1D (V1D) inversion, the forward model may be a layered inhomogeneous TI formation without a borehole.

According to numerical solutions, for a given subarray operated at a particular frequency, the MCI apparent conductivity tensor acquired in an OBM may depend on seven parameters: formation horizontal resistivity (Rh); formation vertical resistivity (Rv or anisotropic ratio Rvh=Rv/Rh); borehole diameter (BD); tool eccentric distance from the borehole center (or standoff) or eccentricity ($d_{ecc}$ or ecc=2$d_{ecc}$/BD); tool eccentricity azimuthal angle ($\varphi_e$ or $\varphi_e^s$); borehole/anisotropic dip angle (dip); and borehole/anisotropic dipping azimuthal angle or formation strike ($\phi_s$). Accordingly, this borehole-formation model is an R1D model with both dip and anisotropy parameters.

The forward model for the V1D inversion may be a vertical layered inhomogeneous TI formation without a borehole. Accordingly, this model may include the shoulder-bed effect but the dip may be assumed a constant in a selected computational window for the inversion processing. As would be appreciated by those of ordinary skill in the art, with the benefit of this disclosure, ignoring the shoulder effect for R1D inversion and/or assuming a constant dip in a selected window for a V1D inversion may produce significant errors. Therefore, the R1D and V1D inverted parameters may be combined to form the desired delivery products for real data processing in some conditions. Two basic 3D rectangular coordinate systems may come into play for describing the forward model: tool/measurement coordinate system $(x_t, y_t, z_t)$ and formation coordinate system $(x_f, y_f, z_f)$, which are connected by coordinate rotations described by rotation matrices. Further, if an invasion occurs, some borehole mud fluid may invade into the formation around the borehole, which changes the resistivity distribution in the formation. In this case, the resistivity distribution is often three dimensional. Accordingly, a 3D inversion must then be used for refining the R1D and/or V1D inverted results.

Figure 4:
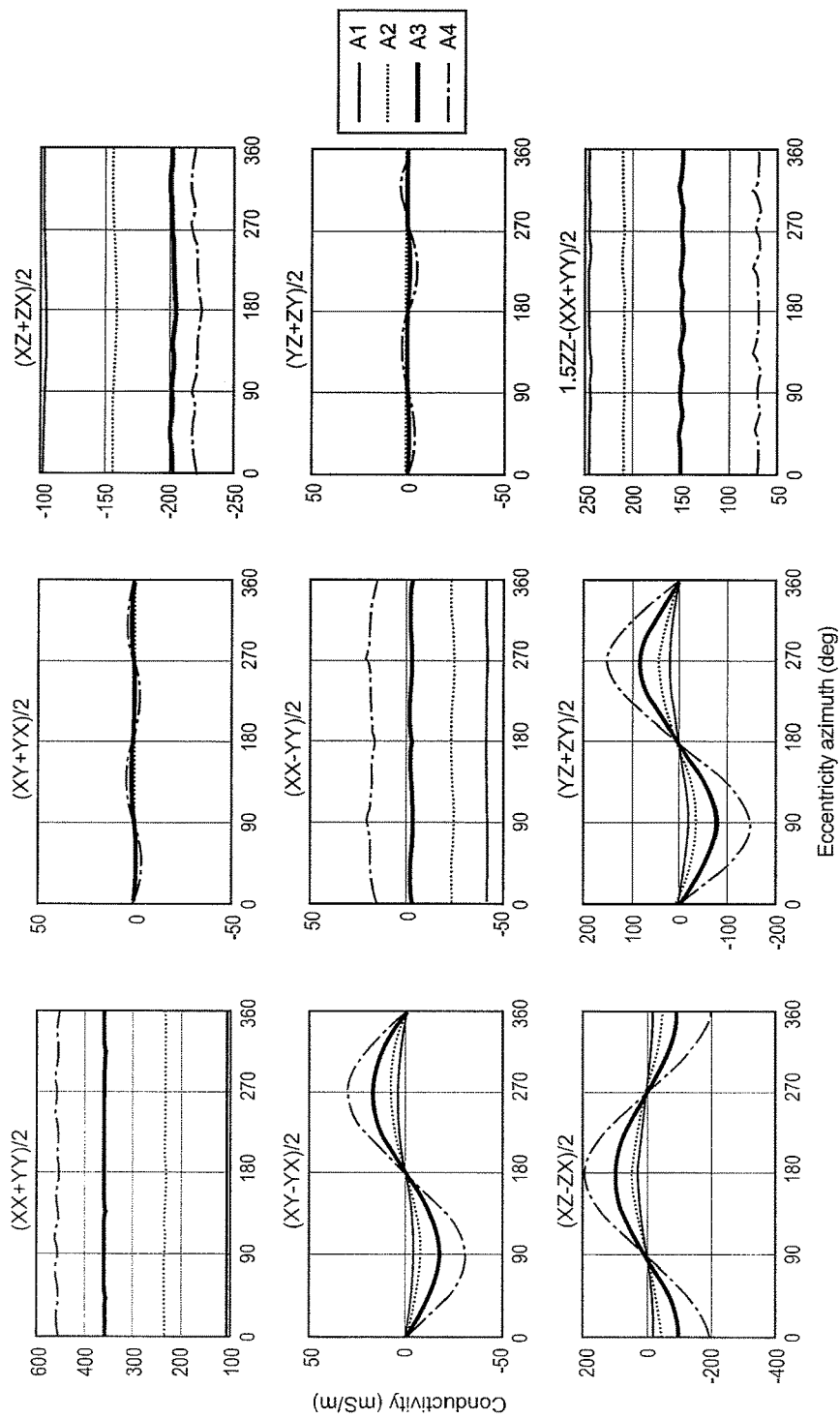
FIG. 4 depicts R-signal responses of MCI combined coupling vs. tool eccentricity azimuth $\varphi_e$ at fixed zero-degree formation strike for four arrays (A1, A2, A3, and A4) at 36 kHz in an 8 inch hole with OBM, $d_{ecc}$=2 inches, Rh=2 ohm-m, Rvh=2 and hole dip=60 degrees.

Based on the forward model discussed above, numerical simulations relating to the borehole effect in OBM wells may be performed. FIGS. 4 and 5 depict two examples of the borehole-effect simulation results.

FIG. 4 depicts R-signal responses of MCI combined coupling vs. tool eccentricity azimuth $\varphi_e$ at fixed zero-degree formation strike for four arrays (A1-A4) at 36 kHz in an 8 inch hole with OBM, $d_{ecc}$=2 inches, Rh=2 ohm-m, Rvh=2 and hole dip=60 degrees. In equation (1) above, $\overline{\sigma_a^{(i)}}$ is a complex tensor having a real part and an imaginary part. The real part of $\overline{\sigma_a^{(i)}}$ is referred to as the R-signal and the imaginary part of $\overline{\sigma_a^{(i)}}$ is referred to as the X-signal. As shown in FIG. 4, the combined MCI signals (XX+YY)/2, (XX−YY)/2, [3ZZ−(XX+YY)]/2, and (XZ+ZX)/2 for all subarrays (here A1 is the longest array, and A4 is the shortest one) are almost independent of the eccentricity azimuth angle. Moreover, (XY−YX)/2, (YZ−ZY)/2, and (XZ−ZX)/2 are approximately sine/cosine-shaped, and both (XY+YX)/2 and (YZ+ZY)/2 are very small compared to other components when other parameters are fixed and at zero-degree strike. Additionally the following expressions for the combined signals (XZ−ZX), (YZ−ZY), and (XY−YX) may be obtained:

$$\sigma_{xz}^{(i)} - \sigma_{zx}^{(i)} = d_{ecc} K_{xzzx}^{(i)} \cdot \cos(\varphi_e^s),$$ [Eq. 4a]

$$\sigma_{yz}^{(i)} - \sigma_{zy}^{(i)} = d_{ecc} K_{yzzy}^{(i)} \cdot \sin(\varphi_e^s),$$ [Eq. 4b]

$$\sigma_{xy}^{(i)} - \sigma_{yx}^{(i)} = d_{ecc} K_{xyyx}^{(i)} \cdot \sin(\varphi_e^s),$$ [Eq. 4c]

where $K_{xzzx}^{(i)}$, $K_{yzzy}^{(i)}$, and $K_{xyyx}^{(i)}$ are three constants for given dip, Rh, and Rv for a subarray and they can be determined by using a MCI BHC library, and $\varphi_e^s$ is the tool eccentricity angle in the strike system, $\varphi_e^s$ being related to the true tool eccentricity angle ($\varphi_e$) by the following equation:

$$\varphi_e^s = \varphi_e - \phi_s$$ [Eq. 4d]

From equations (4a), (4b), (4c), and (4d), the following two equations may be derived and used to determine $\varphi_e$:

$$\varphi_e = \tan^{-1}\left[K_{xzyz}^{(i)} \cdot \frac{\sigma_{yz}^{(i)} - \sigma_{zy}^{(i)}}{\sigma_{xz}^{(i)} - \sigma_{zx}^{(i)}}\right] + \phi_s,$$ [Eq. 4e]

$$\varphi_e = \tan^{-1}\left[K_{xzxy}^{(i)} \cdot \frac{\sigma_{xy}^{(i)} - \sigma_{yx}^{(i)}}{\sigma_{xz}^{(i)} - \sigma_{zx}^{(i)}}\right] + \phi_s,$$ [Eq. 4f]

where $$K_{xzyz}^{(i)} = \frac{K_{xzzx}^{(i)}}{K_{yzzy}^{(i)}} \text{ and } K_{xzxy}^{(i)} = \frac{K_{xzzx}^{(i)}}{K_{xyyx}^{(i)}}.$$

Figure 5A:
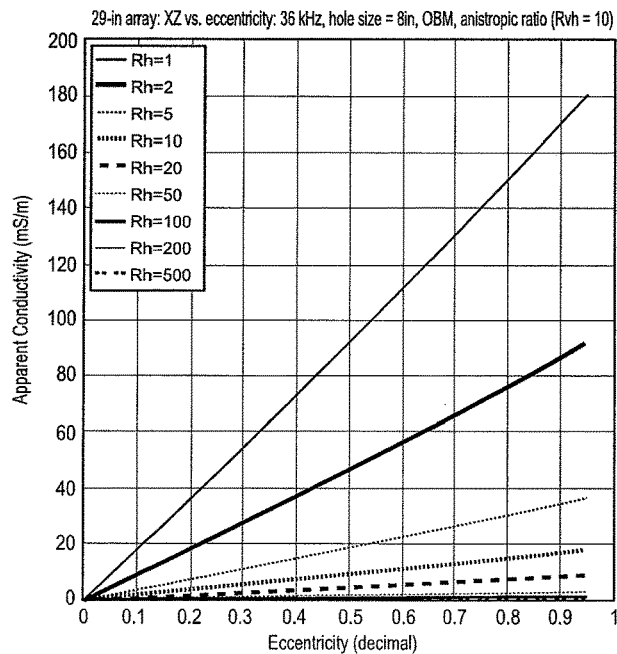
FIGS. 5A and 5B depict R-signal responses of cross couplings XZ and ZX, respectively, plotted against tool eccentricity (ecc) at $\varphi_e$=0 for 29 inch array at 36 kHz in a vertical 8 inch hole filled with OBM having Rh=1-500 ohm-m and Rvh=10.
Figure 5B:
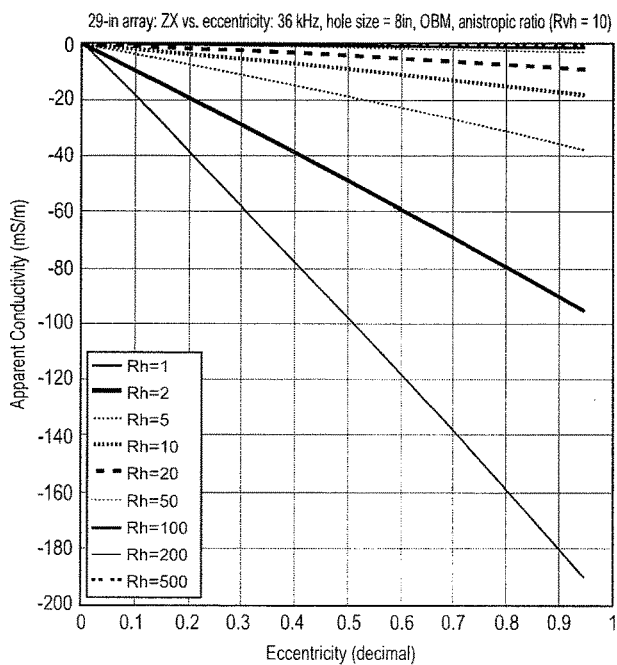

As shown in FIGS. 5A and 5B, both XZ and ZX are almost linear with respect to tool eccentricity (ecc) in vertical wells. Specifically, FIGS. 5A and 5B depict R-signal responses of cross couplings XZ and ZX, respectively, plotted against tool eccentricity (ecc) at $\varphi_e$=0 for 29 inch array at 36 kHz in a vertical 8 inch hole filled with OBM having Rh=1-500 ohm-m and Rvh=10. For other subarrays, similar changes are observed from a simulation. Accordingly, the following equations may be derived for all subarrays:

$$\sigma_{xz}^{(i)} = d_{ecc} \cdot K_{xz}^{(i)},$$ [Eq. 5a]

$$\sigma_{zx}^{(i)} = d_{ecc} \cdot K_{zx}^{(i)},$$ [Eq. 5b]

where $K_{xz}^{(i)}$ and $K_{zx}^{(i)}$ are two constants for given Rh and Rv for a subarray and can be determined by using the MCI BHC library. The term "MCI BHC library" refers to a group of data files which consist of precalculated MCI responses on a multi-dimensional grid about the different formation-borehole parameters such as formation strike, dip, Rh, Rv, logging tool locations in a wellbore, etc., which is mainly for the BHC purpose. From equations (5a) and (5b), another equation (5c) may be obtained:

$$\sigma_{xz}^{(i)} - \sigma_{zx}^{(i)} = d_{ecc} \cdot K_{xzzx}^{(i)},$$ [Eq. 5c]

where $K_{xzzx}^{(i)} = K_{xz}^{(i)} - K_{zx}^{(i)}$. In fact, equation (5c) can also be obtained by letting $\varphi_e^s$=0 in equation (4a).

For adaptive low-pass filtering a Kaiser window may be used as the low-pass filter function as it is a nearly optimal window function. The Kaiser window may be defined by the following equation:

$$K_W(\alpha, m) = \begin{cases} \dfrac{I_0\left(\alpha\sqrt{1-\left(\dfrac{2m}{M}-1\right)^2}\right)}{I_0(\alpha)} & 0 \le m \le M, \\ 0 & \text{otherwise} \end{cases}$$ [Eq. 6]

where $I_0$ is the zero-order modified Bessel function of the first kind; parameter α is an arbitrary real number that determines the shape of the low-pass window; and the integer M is the length of the window. The larger the value of |α|, the narrower the window becomes. Conversely, for larger |α| the width of the main lobe increases in its Fourier transform, while the side lobes decrease in amplitude. Accordingly, the parameter α controls the tradeoff between main-lobe width and side-lobe area. For large values of the parameter α the shape of the low-pass window tends to resemble a Gaussian window.

For a given length of the window (denoted by integer M), the Kaiser window is decided by the parameter α. Accordingly, in order to reduce the high-frequency noise, α is determined based on the data noise level (or uncertainty). Similarly, in order to reduce the horn effect in some couplings of the MCI tensor, α is determined based on both the data uncertainty and the distance between current logging point and the bed boundary.

Consequently, the present disclosure provides a new multiple-log data processing system for obtaining a real-time determination of formation of horizontal resistivities, vertical resistivities, dip and/or strike with MCI data and other multiple logging measurements (e.g. multi-arm caliper and directional measurements and imager/dipmeter). The improved data processing system may include a number of modules or process steps as discussed in more detail in conjunction with FIG. 6.

FIG. 6 generally depicts the different aspects of a data processing method in accordance with an embodiment of the present disclosure. First, at step (602) multiple log data is obtained as an input. The multiple log data may be gathered from a number of different logging tools. Specifically, a logging tool to be used is directed downhole into the formation of interest. Once the logging tool reaches a desirable location, it collects logging data relating to the formation of interest. The collected logging data may then be utilized in conjunction with the methods and systems disclosed herein as input logging data. For instance, the MCI log data may be obtained using an MCI tool. The other logging tools used to gather multiple logging data may include, but are not limited to, multi-arm caliper, directional logging measurements, and imager/dipmeter. In certain embodiments, the input data may be calibrated, temperature corrected and/or be subject to other preprocessing. Similarly, MCI BHC library data and ZZ processing library data may be provided as inputs to the process at steps (604) and (606), respectively, as well as other process control information. As discussed herein, ZZ is the element $\sigma_{zz}^{(i)}$ of conductivity tensor $\overline{\sigma_a^{(i)}}$; and its processing library data consists of a group of data files which include the precalculated borehole response functions and software-focusing (SWF) filter factors.

Next, at step (608), high-frequency noise effects may be reduced using an adaptive low-pass filtering technique based on log-data uncertainty. Bed-boundary determination is then performed based on high vertical-resolution MCI logs at step (610). Specifically, equations (2) and (3) are used to calculate combined log signals in order to determine the bed-boundaries. At step (612) the adaptive low-pass filter may be redesigned using the bed-boundary information and log-data uncertainty. The horn effects may accordingly be reduced using the redesigned adaptive low-pass filter and the log vertical resolution may be enhanced using the combined-signal and SWF processing. At step (614) the R1D inversion of multiple log data may be performed and may use the MCI BHC library as an input. Initial values of all unknown formation parameters, tool location and borehole size may be estimated. The initial estimates may be utilized in conjunction with the improved R1D multistep inversion of the multiple log data to determine the actual values of the unknown formation parameters, tool location and/or borehole size.

At step (616) MCI borehole effects and final BHC-corrected results may be computed. Based on the ZZ BHC-corrected logs, regular MCI (ZZ) data processing may be conducted at step (618). The regular MCI(ZZ) processing may also entail skin effect correction ("SEC"), ZZ SWF and R1D inversion. At step (620) the R1D inversion and the V1D inversion may be combined to form the final inverted results; for example, based on the calculated dip variance within a selected window from the R1D inversion, the R1D inverted results may be selected as the final products if the dip variance is larger than a preselected threshold. Otherwise, the V1D inversion may be selected to refine the R1D inverted results.

At step (622) combined logs may be generated for visual interpretation. Specifically, MCI combined logs, dual frequency logs, and/or differential/derivative logs, as well as other desired logs may be computed based on the BHC-corrected logs if necessary for visual log data interpretation. The true formation dip and strike angles may then be determined using the calculated dip and strike and directional logging data. All processed results may then be delivered as a system output at step (624) for other applications. For instance, in certain embodiments, the Rh and Rv values may be used to compute the sandstone resistivity, which may in turn be used to determine the formation's oil-bearing saturation.

An improved multistep inversion procedure in accordance with an embodiment of the present disclosure may be used to extract unknown model parameters from multiple log data in the exemplary improved data processing system of FIG. 6. Generally, the strike is first determined and used to solve for formation parameters (e.g., horizontal resistivity (Rh), vertical resistivity (Rv) and dip) in the strike system. Finally, the other remaining unknown parameters such as, for example, tool position and borehole size may be determined if they are otherwise not available.

In a TI formation without a borehole, the apparent conductivity tensor $\overline{\sigma_a^{(i)}}$ is reduced into a sparse one due to its couplings XY=YX=YZ=ZY=0 when the strike is zero degrees. Therefore, the tensor rotation may be used to determine the strike. In deviated or vertical wells, $\overline{\sigma_a^{(i)}}$ may be a full tensor, but the combined signals (XY+YX) and (YZ+ZY) may be very small for longer-spacing arrays at lower frequencies if the formation strike is zero degrees as shown in FIG. 4. Accordingly these features of the formation and tensor rotation may be used to estimate the formation strike.

The ZZ, (XX+YY), (XX−YY), [3ZZ−(XX+YY)]/2, and (XZ+ZX) components of longer spacing arrays are only slightly affected by the tool position ($d_{ecc}$/ecc and $\varphi_e$) in OBM wells (also see FIG. 4). As a result, the effect of tool position on these components ($d_{ecc}$ and $\varphi_e$) may be ignored without detracting from the results of the analysis. Therefore, at step (614) of FIG. 6, the R1D inversion algorithm of multiple log data may be implemented. FIG. 7 depicts general steps associated with R1D inversion algorithm of multiple log data in accordance with an exemplary embodiment of the present disclosure.

First, an initial guess of the strike angle ($\phi_s$) is estimated as $\phi_s^{(O)}$ at step (702). This initial guess may be obtained from long-spacing and low-frequency MCI data in the tool coordinate system using the formulas:

$$\phi_s = \frac{1}{2}\tan^{-1}\left(imag\left[\frac{\sigma_{xy}^{(i)} + \sigma_{yx}^{(i)}}{\sigma_{xx}^{(i)} - \sigma_{yy}^{(i)}}\right]\right) \text{ or}$$

$$\phi_s = \tan^{-1}\left(imag\left[\frac{\sigma_{yz}^{(i)} + \sigma_{zy}^{(i)}}{\sigma_{xz}^{(i)} - \sigma_{zx}^{(i)}}\right]\right)$$

Then, in the strike system, the following minimum problem may be solved at some $\phi_s$ initial perturbed range $\phi_s^{(O)}(1-\Delta) \leq \phi_s \leq (1+\Delta)\phi_s^{(O)}$:

$$\min \Sigma(|\sigma_{xy}^{(i)} + \sigma_{yx}^{(i)}| + |\sigma_{yz}^{(i)} + \sigma_{zy}^{(i)}|)$$

where $\Delta$ is a pre-selected delta value ($0<\Delta<1$), or between 0 and 360 degrees for determining the final $\phi_s$. Once the strike is known, the MCI data may be rotated to zero strike angle at step (704) for obtaining MCI data in the strike system.

Next, an initial guess for the next iteration is estimated at step (706). If imager measurement is available, vertical-resolution matched processing may be performed to the imager data due to the difference in vertical resolution of the MCI measurements and the imager measurements. The imager measurements may provide the formation dip information. Accordingly, the imager measurements may be used as a guess in the inversion. However, the MCI vertical resolution is much lower than that of the imager measurement. Therefore, resolution matching may need to be performed to the imager dip information. The processed imager-dip may then be used as the initial guess of formation dip for the next inversion. If imager measurements are not available, MCI data may be used to estimate an initial guess.

Next, at step (708) tool eccentricity angle ($\varphi_e$) and eccentricity ($d_{ecc}$) may be determined from multi-arm caliper logging data if the data is available. Alternatively, calculated $\varphi_e$ and $d_{ecc}$ from the multi-arm caliper logging data may be selected as their initial values for the next inversion.

At step (710), an initial guess of horizontal resistivity (Rh) and vertical resistivity (Rv) or (Rvh) may be estimated. The formation characteristics (dip, Rh, Rv) may then be determined from inversion of ZZ and combined components [3ZZ−(XX+YY)]/2, (2ZZ−XX), (2ZZ−YY), (XX−YY), and (XZ+ZX)/2 from arrays having a shorter spacing (e.g., 17 inches and 29 inches) at higher frequencies (e.g., 36 kHz, 60 kHz and 84 kHz) due to their higher vertical resolution and reduction of horn effects. If caliper data is not available, the borehole size or diameter (BD) may be determined from the inversion at the same time.

If the borehole relative dip is small (e.g., less than 30 degrees), then both dip and Rh are fixed at the inverted values from the above inversion and only Rv (or Rvh) is updated by using the inversion of the ratio of two combined signals (XX+YY)/[3ZZ−(XX+YY)] due to its better sensitivity to parameter Rv.

Next, at step (712) the initial value of tool-eccentricity angle ($\varphi_e$) may be estimated from the short-spacing and high-frequency cross components in the strike system by using equations (4e) and/or (4f) and inverted dip, Rh, and Rv. Similarly, an initial value for tool eccentricity ($d_{ecc}$) may be estimated from the cross components in the strike system by using equations (4a), (4b) or (4c) and inverted dip, Rh, Rv and tool eccentricity angle. The $\varphi_e$ and $d_{ecc}$ values may be determined at step (714) by solving for a two-unknown minimum problem.

At step (716) it is determined whether $\varphi_e$ and $d_{ecc}$ data are available from the multi-arm caliper logging data. If yes, at step (718) the final $\varphi_e$ and $d_{ecc}$ may be determined from weighted average of the inverted values from the MCI data inversion and from the caliper logging data. The weighted coefficients may then be determined based on the bed-boundary information and log-data uncertainty and the process proceeds to step (718). If data from the multi-arm caliper logging data is unavailable, the process proceeds directly to step (718).

Next, at step (720) it is determined whether the dip angle is almost zero degrees. If the dip is almost zero degrees (dip≤ε, here ε is a very small positive number), then the process proceeds to step (722) and it is assumed that $\varphi_e=\phi_s$ and $\phi_s=0$. Rh is then reinverted by only using the ZZ component. Next, Rv is resolved by only using the ratio (XX+YY)/[3ZZ−(XX+YY)]. Similarly, the value of $d_{ecc}$ is re-determined using equations (5a), (5b) or (5c) by solving the linear equations or a quadratic programming problem of XZ or ZX or their combined signal (XZ+ZX). The process then proceeds to step (724).

At step (724), the spike effects on the inverted parameters may be reduced using the adaptive low-pass filters based on the Kaiser window as discussed in more detail above. In one embodiment, all steps between step (724) and step (706) may consist of an inversion loop for refining the inverted results. The above steps may be repeated until it is determined at step (726) that the difference between two successive iterations (i.e. two successive inverted results) falls below a predetermined threshold value. If not, the process returns to step (706) and is repeated. Once the difference between two successive iterations falls below a threshold value, the process continues to step (728) where the model parameters may be output for MCI BHC processing and other applications. The process then terminates at step (730).

In certain embodiments, the methods and systems disclosed herein may further improve data processing by expressing the inversion issues involved as different constrained optimization problems. In certain embodiments, an object-function comparison and/or a constrained Levenberg-Marquardt ("LM") method may be used for solving for all unknown parameters. In one embodiment, the object-function comparison method may be used to solve the lower-dimensional optimization problems (e.g., less than or equal to 2). For higher-dimensional optimization problems (e.g., higher than 2) the constrained LM method may be used. The Jacobian matrix of the LM method may be determined analytically by using the interpolated function created based on the prebuilt look-up table of MCI responses, which improves the computational accuracy of the Jacobian matrix compared to numerical finite-difference methods. Accordingly, the methods disclosed herein can further improve the speed and efficiency of the inversion and whole data processing.

In certain embodiments, the methods disclosed herein may be performed using an information handling system. Specifically, the information handling system may include computer-readable media. The computer-readable media may contain machine-readable instructions that direct the information handling system to perform the methods disclosed herein. Additionally, the information handling system may include a user interface to permit a user to analyze, monitor and manipulate the results obtained using the methods disclosed herein and may further provide a visual interpretation of the obtained results.

Accordingly, the present disclosure provides an improved method for processing data to determine formation properties such as, for example, horizontal resistivity, vertical resistivity, dip and strike of the formation. The improved methods provide results in a fast and efficient manner and improve the accuracy of the obtained results by using MCI measurements combined with other multiple logging data (e.g., multi-arm caliper and directional measurements, imager/dipmeter). Additionally, the improved methods and systems deliver more accurate conventional ZZ resistivity logs based on an improved BHC model that includes dip and resistivity anisotropy. Moreover, the improved methods disclosed herein reduce horn effects and enhance vertical resolution based on combined MCI signals, an adaptive low-pass filtering technique and SWF processing.

Therefore, the present disclosure is well-adapted to carry out the objects and attain the ends and advantages mentioned as well as those which are inherent therein. While the disclosure has been depicted and described by reference to exemplary embodiments of the disclosure, such a reference does not imply a limitation on the disclosure, and no such limitation is to be inferred. The disclosure is capable of considerable modification, alteration, and equivalents in form and function, as will occur to those ordinarily skilled in the pertinent arts and having the benefit of this disclosure. The depicted and described embodiments of the disclosure are exemplary only, and are not exhaustive of the scope of the disclosure. Consequently, the disclosure is intended to be limited only by the spirit and scope of the appended claims, giving full cognizance to equivalents in all respects. The terms in the claims have their plain, ordinary meaning unless otherwise explicitly and clearly defined by the patentee.

What is claimed is:

1. A method of multi-component induction (MCI) logging for a formation of interest comprising:
inputting logging data from an MCI logging tool relating to the formation of interest, wherein the logging data comprises triaxial measurements;
removing high frequency noise from the logging data;
performing bed-boundary determination using the logging data;
applying an adaptive low pass filter to the logging data,
inverting the logging data, wherein the inverting comprises performing a V1D inversion of the logging data; and
determining one or more formation properties based on the inverted logging data.

2. The method of claim 1, wherein the adaptive low pass filter reduces horn effect of the logging data.

3. The method of claim 1, wherein inputting logging data relating to the formation of interest comprises:
placing a logging tool in the formation of interest;
collecting data from the formation of interest using the logging tool; and
using the collected data as input logging data.

4. The method of claim 1, wherein inputting logging data comprises obtaining the logging data from a plurality of logging tools.

5. The method of claim 4, wherein the plurality of logging tools are selected from a group consisting of an MCI tool, a multi-arm caliper, an imager, and a dipmeter.

6. The method of claim 1, wherein applying an adaptive low pass filter to the logging data comprises applying a Kaiser window.

7. The method of claim 1, wherein inverting the logging data comprises:
performing an R1D inversion of the logging data; and
combining the R1D inversion of the logging data and the V1D inversion of the logging data.

8. The method of claim 1, wherein visually interpreting the inverted logging data comprises generating one or more of an MCI combined log, a dual frequency log, a differential log and a derivative log.

9. The method of claim 1, wherein the logging data reflects at least one of a horizontal resistivity of the formation of interest, a vertical resistivity of the formation of interest, a dip of the formation of interest and a strike of the formation of interest.

10. The method of claim 1, further comprising determining one or more properties of the formation of interest, wherein the one or more properties are selected from a group consisting of horizontal resistivity, vertical resistivity, dip and strike of the formation.

11. A multi-component logging system comprising:
a memory;
a processor coupled to the memory, wherein the memory comprises one or more instructions that, when executed by the processor, cause the processor to:
receive logging data from an MCI logging tool comprising triaxial measurements relating to a formation of interest,
remove high frequency noise from the logging data;
perform bed-boundary determination using the logging data;
apply an adaptive low pass filter to the logging data, invert the logging data using V1D inversion; and
determine one or more formation properties based on the inverted logging data.

12. The system of claim 11, wherein the adaptive low pass filter reduces horn effect of the logging data.

13. The system of claim 11, wherein receiving logging data relating to the formation of interest comprises:
placing a logging tool in the formation of interest;
collecting data from the formation of interest using the logging tool; and
using the collected data as input logging data.

14. The system of claim 11, wherein receiving logging data comprises obtaining the logging data from a plurality of logging tools.

15. The system of claim 14, wherein the plurality of logging tools are selected from a group consisting of an MCI tool, a multi-arm caliper, an imager, and a dipmeter.

16. The system of claim 11, wherein applying an adaptive low pass filter to the logging data comprises applying a Kaiser window.

17. The system of claim 11, wherein inverting the logging data comprises:
performing an R1D inversion of the logging data; and
combining the R1D inversion of the logging data and the V1D inversion of the logging data.

18. The system of claim 11, wherein visually interpreting the inverted logging data comprises generating one or more of an MCI combined log, a dual frequency log, a differential log and a derivative log.

19. The system of claim 11, wherein the logging data reflects at least one of a horizontal resistivity of the formation of interest, a vertical resistivity of the formation of interest, a dip of the formation of interest and a strike of the formation of interest.

20. The system of claim 11, further comprising instructions to determine one or more properties of the formation of interest, wherein the one or more properties are selected from a group consisting of horizontal resistivity, vertical resistivity, dip and strike of the formation.

* * * * *